United States Patent
Abousleiman et al.

(10) Patent No.: US 7,960,879 B2
(45) Date of Patent: Jun. 14, 2011

(54) HEAT BRIDGE BETWEEN ACCESSORY CASING AND AIRPLANE ENGINE ACCESSORY BOX

(75) Inventors: Vincent Abousleiman, Courbevoie (FR); Hugues Henri Raymond Linet, Asnieres sur Seine (FR)

(73) Assignee: Hispano Suiza, Colombes (FR)

( * ) Notice: Subject to any disclaimer, the term of this patent is extended or adjusted under 35 U.S.C. 154(b) by 246 days.

(21) Appl. No.: 11/750,726

(22) Filed: May 18, 2007

(65) Prior Publication Data

US 2007/0278874 A1 Dec. 6, 2007

(30) Foreign Application Priority Data

May 19, 2006 (FR) ...................................... 06 04488

(51) Int. Cl.
- *H02K 9/22* (2006.01)
- *H02K 7/08* (2006.01)
- *H02K 5/02* (2006.01)
- *H02K 5/15* (2006.01)
- *H02K 5/16* (2006.01)

(52) U.S. Cl. ................ 310/64; 310/90; 310/91; 310/400

(58) Field of Classification Search ..................... 310/71, 310/90, 85, 89, 258, 64, 52, 91, 254, 254.1
See application file for complete search history.

(56) References Cited

U.S. PATENT DOCUMENTS

| | | | | |
|---|---|---|---|---|
| 2,850,876 A * | 9/1958 | Wood | ............... | 60/805 |
| 3,777,195 A * | 12/1973 | Potter | ............... | 310/91 |
| 3,825,377 A * | 7/1974 | Bottoms | ............... | 418/170 |
| 4,797,590 A * | 1/1989 | Raad et al. | ............... | 310/68 D |
| 4,965,477 A * | 10/1990 | Stadler et al. | ............... | 310/114 |
| 5,365,133 A * | 11/1994 | Raad | ............... | 310/68 D |
| 5,806,169 A * | 9/1998 | Trago et al. | ............... | 29/596 |
| 6,040,647 A * | 3/2000 | Brown et al. | ............... | 310/89 |
| 6,212,974 B1 * | 4/2001 | Van Duyn | ............... | 74/606 R |
| 6,710,490 B1 * | 3/2004 | Whaley | ............... | 310/99 |
| 7,053,512 B2 * | 5/2006 | Pittius | ............... | 310/105 |
| 7,154,201 B2 * | 12/2006 | Kuhn | ............... | 310/58 |
| 2005/0183529 A1 * | 8/2005 | Miller | ............... | 74/420 |
| 2007/0085429 A1 * | 4/2007 | van der Woude | ............... | 310/64 |
| 2007/0164087 A1 * | 7/2007 | Payne | ............... | 228/119 |

FOREIGN PATENT DOCUMENTS

| | | |
|---|---|---|
| JP | 61 145325 | 7/1986 |
| JP | 2000-2156 | 1/2000 |

* cited by examiner

*Primary Examiner* — Quyen Leung
*Assistant Examiner* — Eric Johnson
(74) *Attorney, Agent, or Firm* — Oblon, Spivak, McClelland, Maier & Neustadt, L.L.P.

(57) ABSTRACT

An airplane engine accessory box carrying an electrical machine such as an alternator, having a rotor that is guided in rotation in a bearing carried by a support part made of a material having a low coefficient of thermal expansion, itself carried by a stator cover that acts as a heat bridge between the body of the stator of the electrical machine and the casing of the accessory box.

16 Claims, 1 Drawing Sheet

HEAT BRIDGE BETWEEN ACCESSORY CASING AND AIRPLANE ENGINE ACCESSORY BOX

The invention relates to an accessory box in an airplane engine such as a turbojet or a turboprop, the box having a metal casing with an electrical machine mounted at the end thereof, in particular an alternator with a wound stator and a permanent magnet rotor serving to provide electricity to certain pieces of equipment of the engine.

BACKGROUND OF THE INVENTION

The rotor of the electrical machine is guided in rotation in a bearing, generally a roller or ball bearing, carried by an annular cover that closes the stator of the electrical machine and that serves to secure it to the casing of the accessory box.

The electrical machine is characterized by speeds of rotation that are high and by loads that are low, thereby leading to dynamic phenomena that can in turn lead to damage to the bearing.

In order to avoid or at least reduce that drawback, a cover is used that is made of titanium because it has a low coefficient of thermal expansion, thus limiting differential thermal expansion between the outer ring of the bearing and the portion of the cover in which said ring is mounted.

This avoids creating significant clearance in the bearing, where such clearance tends to increase the unbalance of the rotor and gives rise to rapid wear and deterioration of the bearing.

In operation, the electrical machine leads to a large amount of heat being dissipated in the winding of its stator, and this heat must be evacuated by conduction into the casing of the box, e.g. made of aluminum and thus constituting a good conductor of heat.

Nevertheless, the stator cover of the electrical machine impedes this evacuation of heat since titanium is a poor conductor of heat (its coefficient of thermal conduction is about one-twentieth that of aluminum). This leads to heat accumulating and to a significant rise of temperature in the electrical machine, thus leading to a risk of the oil contained in the machine coking and to excess heating of the stator which loses its mechanical properties.

OBJECTS AND SUMMARY OF THE INVENTION

A particular object of the present invention is to avoid those drawbacks.

To this end, the invention provides an airplane engine accessory box comprising a casing of a material that is a good conductor of heat having mounted thereon the stator of an electrical machine having a rotor guided in a bearing carried by a support part made of a material having a relatively small coefficient of thermal expansion, wherein the support part of the bearing is carried by a stator cover of the electrical machine, said cover being pressed against the casing of the accessory box and being made of a material that is a good conductor of heat, having thermal conductivity that is relatively much greater than that of the support part in order to form a heat bridge between the stator of the electrical machine and the casing of the box.

The invention thus makes it possible to conserve the advantages of the means used in the prior art, while avoiding their disadvantages. Making a bearing support part out of a material having a low coefficient of thermal expansion serves to avoid differential expansion between the bearing and the support part, and thus to reduce unbalance and damage to the bearing. Mounting the support part on a stator cover made of a material that is good conductor of heat and that is pressed against the casing of the box enables the heat dissipated in the stator of the electrical machine to be evacuated by conduction.

According to another characteristic of the invention, the bearing support part is secured in an orifice of the stator cover and is centered in a corresponding orifice of the casing of the box.

Advantageously, the bearing support part is secured in the orifice of the stator cover as an interference fit.

In an embodiment of the invention, the bearing support part is an annular part having a cylindrical skirt at its outer periphery that is engaged in orifices of the stator cover and of the box casing, and having an inner periphery that includes means for mounting the outer ring of the bearing for the rotor of the electrical machine.

Advantageously, an outer annular rim is formed on said support part and is clamped between the stator cover and the box casing for the purpose of securing said support part.

In a particular embodiment of the invention, the support part is made of titanium, while the stator cover of the electrical machine and the accessory box casing are made of aluminum.

The invention also provides a bearing support part for an airplane engine accessory box as described above, wherein it is made of a material having a relatively small coefficient of thermal expansion and includes a cylindrical skirt for mounting in orifices of a stator cover of the electrical machine and of an accessory box casing.

The invention also provides a stator cover for an airplane engine accessory box as described above, wherein it is made of a material that is a good conductor of heat and is annular in shape, its inner periphery forming a surface for centering a bearing support part and its outer portion forming means for bearing against and securing to the accessory box casing.

The invention also provides an airplane engine, fitted with an accessory box as described above.

BRIEF DESCRIPTION OF THE DRAWINGS

The invention can be better understood and other characteristics, details, and advantages thereof appear more clearly on reading the following description made by way of example and with reference to the accompanying drawings, in which.

MORE DETAILED DESCRIPTION

Figure 1:
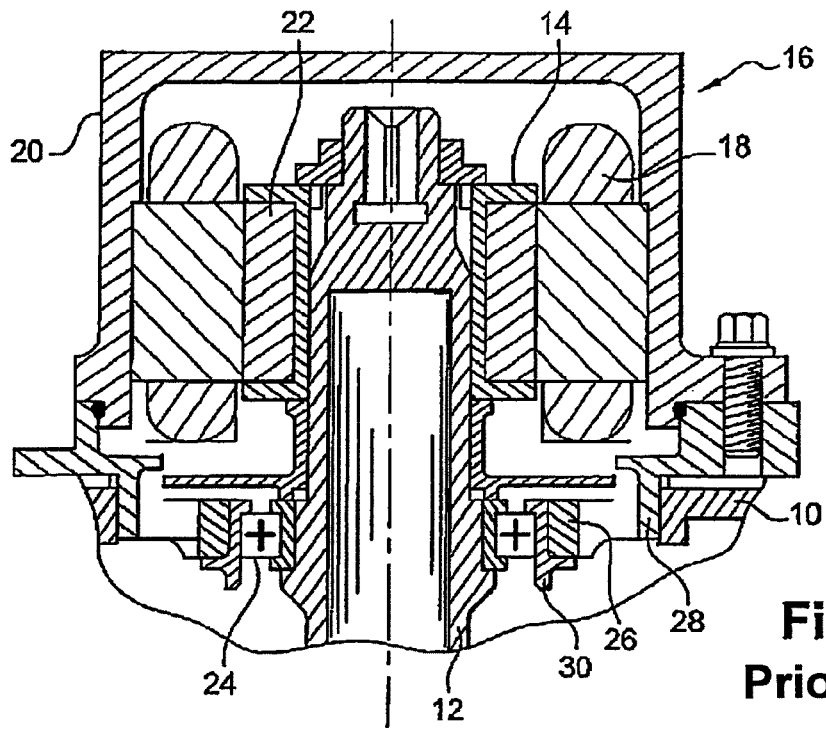
FIG. 1 is a fragmentary diagrammatic view in axial section of an electrical machine mounted on an accessory box of the prior art.

In FIG. 1, reference 10 designates the aluminum casing of an airplane engine accessory box, e.g. for a turbojet, said box including a rotary shaft 12 that extends to the outside of the casing 10 and that carries a rotor 14 of an electrical machine, such as an alternator 16 for electrically powering certain components, for example a computer.

The alternator 16 comprises a wound stator 18 carried by a body 20 made of a material that is good conductor of heat, e.g. aluminum, within which there turns the rotor 14 which is fitted with permanent magnets 22.

The shaft 12 is guided in rotation by a bearing such as a roller or ball bearing 24 mounted in the central orifice of an annularly-shaped cover 26 that closes the body 20 of the alternator stator and that has a cylindrical skirt 28 engaged in a corresponding orifice of the casing 10 of the accessory box.

The cover 26 is made of titanium, which is selected because of its light weight and its low coefficient of thermal expansion. Because of this characteristic of the cover, the amount of differential thermal expansion between the cover 26 and the outer ring 30 of the bearing that is mounted in the central orifice of the cover is small or almost zero, such that in operation the bearing 24 remains well centered and guided in the central orifice of the cover 26.

Nevertheless, the coefficient of thermal conductivity of titanium is relatively much smaller than that of aluminum, such that the cover 26 opposes the transfer into the casing 10 of the accessory box of the heat that is generated in the stator 18 of the alternator while in operation.

This can lead to the oil contained in the stator coking and to excessive heating thereof, as mentioned above.

The present invention enables this drawback to be avoided in a manner that is simple and effective by replacing the cover 26 of the alternator stator with an assembly of two parts, comprising a part 40 for supporting the bearing 24 and an annular part 42 that carries the support part 40 and that serves both as a cover for closing the stator body and as a member providing a thermal connection with the casing 10 of the accessory box.

Figure 2:
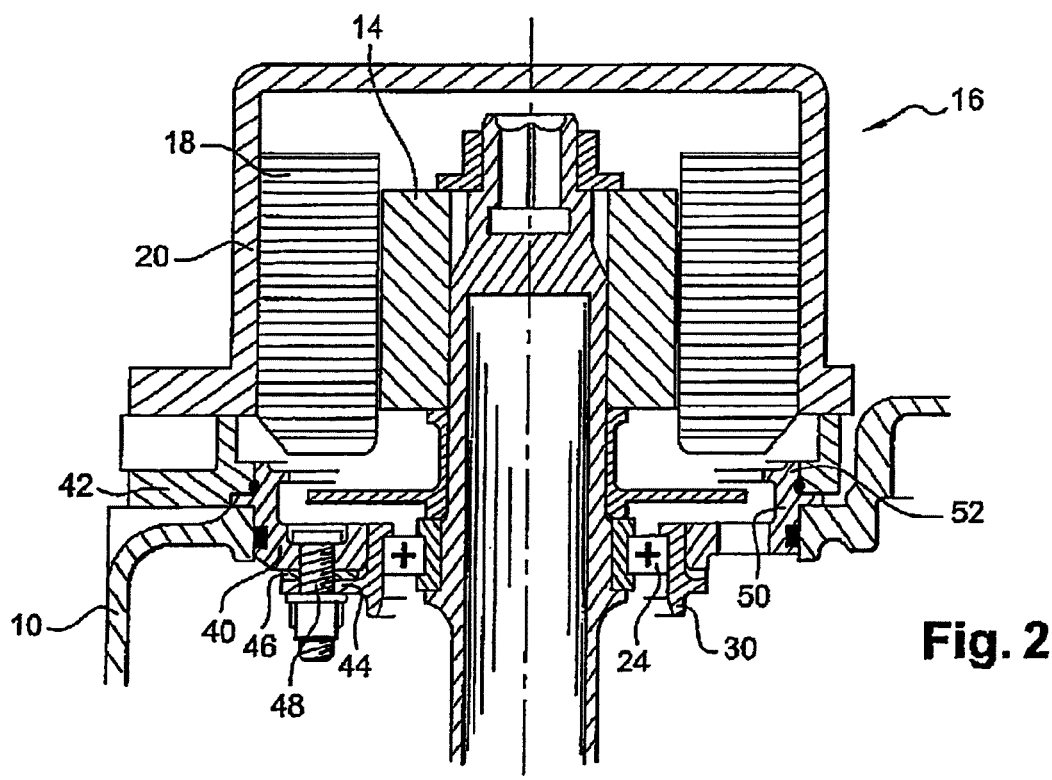
FIG. 2 is a view corresponding to FIG. 1 and shows an electrical machine mounted on an accessory box of the invention.

As can be seen in FIG. 2, in which elements already shown in FIG. 1 are designated by the same reference numbers, the outer ring 30 of the bearing 24 is carried in the central orifice of the support part 40 and includes an outer annular collar 44 pressed against the support part 40 via a lining 46 and secured to said support part by bolts 48.

At its outer periphery, the support part 40 has a cylindrical skirt 50 whereby it is centered in an orifice of the casing 10 of the accessory box and is secured as an interference fit in a central orifice of the annular part 42.

The part 42 has a bottom face pressed against an annular portion of the casing 10 of the accessory box and an opposite face bearing against the end of the body 20 of the stator of the alternator 16, the part 42 being secured to said body by screws in the same manner as the cover 26 is secured to the body 20 in FIG. 1.

Sealing O-rings are mounted between the skirt 50 of the support part 40 and the edge of the orifice in the casing 10 within which the skirt is mounted, and between said skirt and the edge of the orifice in the annular part 42. Furthermore, the skirt 50 is formed with an outer annular collar 52 that is clamped between the casing 10 of the accessory box and the annular part 42.

The support part 40 is made of a material having a relatively low coefficient of thermal expansion, e.g. of titanium, such that differential thermal expansion between said part and the outer ring 30 of the bearing is as small as possible.

The annular part 42 is made of a material that is a good conductor of heat, e.g. aluminum, having thermal conductivity that is relatively much greater than that of the support part 40, and it provides a heat bridge between the body 20 of the alternator stator and the casing 10 of the accessory box, both of which are made of aluminum.

Thus, the heat energy that is given off in the stator while the alternator is in operation is evacuated via the annular part 42 of the casing 10 of the accessory box and does not accumulate inside the stator.

Naturally, the bearing support part 40 could be made of a material having a low coefficient of thermal expansion other than titanium, and the annular part 42 could be made of a material that is a good conductor of heat, other than aluminum, the materials used preferably being lightweight.

What is claimed is:

1. An airplane engine accessory box comprising:
a casing of the airplane accessory box that includes a material that is a good conductor of heat having mounted thereon a stator of an electrical machine having a rotor guided in a bearing carried by a support part made of a material having a relatively small coefficient of thermal expansion, wherein the support part of the bearing is carried by a stator cover of the electrical machine, the support part of the bearing being secured in an orifice of the stator cover and being centered in a corresponding orifice of the casing of the airplane accessory box, said stator cover being pressed against the casing of the airplane accessory box and being made of a material that is a good conductor of heat, having thermal conductivity that is relatively much greater than that of the support part in order to form a heat bridge between the stator of the electrical machine and the casing of the box.

2. A box according to claim 1, wherein the bearing support part is an annular part having a cylindrical skirt at its outer periphery that is engaged in the orifices of the stator cover and of the box casing and that has an inner periphery that includes means for mounting the outer ring of the bearing.

3. A box according to claim 1, wherein the support part includes an outer annular rim clamped between the stator cover and the box casing.

4. A box according to claim 1, wherein an outer ring of the bearing is secured by bolts to the support part.

5. A box according to claim 1, wherein the bearing support part is made of titanium.

6. A box according to claim 1, wherein the stator cover and the box casing are made of aluminum.

7. A bearing support part for an airplane engine accessory box according to claim 1, the support part being made of a material having a relatively small coefficient of thermal expansion and includes a cylindrical skirt for mounting in orifices of a stator cover of the electrical machine and of an accessory box casing.

8. A stator cover for an airplane engine accessory box according to claim 1, the stator cover being made of a material that is a good conductor of heat and is annular in shape, its inner periphery forming a surface for centering a bearing support part and its outer portion forming means for bearing against and securing to the accessory box casing.

9. An airplane engine fitted with an accessory box according to claim 1.

10. An airplane engine accessory box comprising:
a casing of the airplane engine accessory box,
an accessory body that includes a first material that has a first thermal conductivity; and
an electrical machine including
a stator that is mounted on an internal surface of the accessory body,
a rotor that is guided in a bearing carried by a support part that includes a second material that has a second thermal conductivity, and
a stator cover that carries the support part, the support part being secured in a central orifice of the stator cover and being centered in an orifice of the casing, said stator cover being pressed against the casing and the accessory body and including a third material that has a third thermal conductivity, wherein the third thermal conductivity is higher than the second thermal conductivity such that the stator cover forms a heat bridge between the accessory body and the casing.

11. A box according to claim 10, wherein the support part is an annular part that includes a cylindrical skirt at an outer periphery thereof that is engaged in the central orifice of the stator cover and the orifice of the casing and that includes an inner periphery that includes a mechanism that mounts an outer ring of the bearing to the support part.

12. A box according to claim 10, wherein the support part includes an outer annular rim clamped between the stator cover and the casing.

13. A box according to claim 10, wherein an outer ring of the bearing is secured by bolts to the support part.

14. A box according to claim 10, wherein the support part is made of titanium.

15. A box according to claim 10, wherein the stator cover and the casing are made of aluminum.

16. An airplane engine fitted with an accessory box according to claim 10.

* * * * *